(12) United States Patent  (10) Patent No.: US 8,995,040 B2
Fritz  (45) Date of Patent:  Mar. 31, 2015

(54) LIGHTING ELEMENT IN THE EXTERIOR MIRROR

(75) Inventor: Daniel Fritz, Stuttgart (DE)

(73) Assignee: SMR Patents S.a.r.l., Luxembourg (LU)

( * ) Notice: Subject to any disclaimer, the term of this patent is extended or adjusted under 35 U.S.C. 154(b) by 192 days.

(21) Appl. No.: 13/315,920

(22) Filed: Dec. 9, 2011

(65) Prior Publication Data

US 2012/0147473 A1  Jun. 14, 2012

(30) Foreign Application Priority Data

Dec. 10, 2010  (EP) .................................. 10194437

(51) Int. Cl.
| | |
|---|---|
| *G02F 1/07* | (2006.01) |
| *B60R 1/06* | (2006.01) |
| *G08G 1/16* | (2006.01) |
| *B60Q 1/26* | (2006.01) |
| *G02F 1/29* | (2006.01) |
| *B60R 1/00* | (2006.01) |
| *G06K 9/20* | (2006.01) |

(52) U.S. Cl.
CPC .............. B60Q 1/2665 (2013.01); G08G 1/166 (2013.01); B60R 1/06 (2013.01); G02F 1/07 (2013.01); *G02F 1/29* (2013.01); *G08G 1/167* (2013.01); *B60R 1/006* (2013.01); *B60R 1/008* (2013.01); *G06K 9/2036* (2013.01)
USPC ........... 359/253; 359/318; 348/148; 348/149; 340/425.5; 340/937

(58) Field of Classification Search
CPC .............. G02F 1/07; G02F 1/29; G08G 1/16; G08G 1/166; G08G 1/167; B60R 1/006; B60R 1/008; B60R 1/02; B60R 1/06; G06K 9/20; G06K 9/2018; G06K 9/2036; G06K 9/209

USPC ......... 359/265, 267, 247, 253, 272, 601–604, 359/839, 841, 842, 844, 846, 847, 877; 362/382, 494, 545; 340/425.5, 435, 340/438, 463, 815.4, 904, 905; 348/118, 348/148, E7.085; 349/1, 11, 56
See application file for complete search history.

(56) References Cited

U.S. PATENT DOCUMENTS

| | | | |
|---|---|---|---|
| 7,581,859 B2 * | 9/2009 | Lynam ........................... | 362/494 |
| 7,855,755 B2 * | 12/2010 | Weller et al. .................... | 349/11 |
| 8,164,482 B2 * | 4/2012 | Lynam et al. ................. | 340/904 |
| 8,179,236 B2 * | 5/2012 | Weller et al. ................ | 340/425.5 |
| 8,282,253 B2 * | 10/2012 | Lynam ........................... | 362/494 |
| 8,456,327 B2 * | 6/2013 | Bechtel et al. ................ | 340/937 |
| 2008/0106389 A1 | 5/2008 | Desai | |

FOREIGN PATENT DOCUMENTS

| | | |
|---|---|---|
| DE | 10318741 | 11/2004 |
| DE | 102005038179 | 2/2007 |

(Continued)

OTHER PUBLICATIONS

European Search Report for application No. EP 10 19 4437 dated May 17, 2011.

*Primary Examiner* — Loha Ben
(74) *Attorney, Agent, or Firm* — Reising Ethington PC

(57) ABSTRACT

An exterior mirror assembly with an optical display is suggested, whereby a light opening (2) is provided on the exterior mirror assembly for the passage of light of a warning display. The optical display comprieses of a display housing (4), into which an active illuminated display element (10) is mounted as a light source.

11 Claims, 3 Drawing Sheets

(56) References Cited

FOREIGN PATENT DOCUMENTS

| | | |
|---|---|---|
| EP | 2151350 | 2/2010 |
| FR | 2938220 | 5/2010 |
| WO | 2007005942 | 11/2007 |

* cited by examiner

LIGHTING ELEMENT IN THE EXTERIOR MIRROR

FIELD OF THE INVENTION

The invention relates to an exterior mirror with an optical display device with at least one light source and a control unit, which is assigned to an assistance system.

BACKGROUND OF THE INVENTION

Motor vehicles with assistance systems such as a lane change assistance system are known in DE 103 18 741 A1. In the process, one or several sensors monitor the surroundings of the vehicle at the sides and at the rear. A control unit calculates whether an upcoming lane change could result in a hazardous situation. If there is a high degree of danger, an optical display device, usually an LED, is triggered on the exterior mirror, which should give an indication of the danger. Thereby, it is intended that the hazardous situation is continually reproduced by the optical display means.

However, systems of this type have the disadvantage that the perceptibility of the optical signal is not guaranteed in different ambient light conditions. A fixed, pre-determined light intensity can lead to irritating the driver in darkness, and in contrast, cannot be detected at all in bright sunshine. A solution is known in DE 10 2005 038 179 B4, in which the brightness of the light source can be changed by the control unit, depending on a measurand provided to the control device, showing a measurement for the ambient brightness.

Instead of operating with a pre-determined brightness, the display here adapts to the current ambient brightness. This means that in the case of relatively dark surroundings, the light source of the optical display device only illuminates very weakly, so that whilst the display can still clearly be seen with a glance in the direction of the exterior mirror, it does not irritate or even dazzle. In very bright surroundings, for example, in bright sunshine, the light source then accordingly illuminates brightly, so that its light is not covered by the sunlight. The optical perceptibility is therefore adapted to the needs of the driver.

No optical solution is suggested in addition to this. In optical displays, there is also always the problem that the display surface should be illuminated homogeneously, and in the case of use in a motor vehicle, should also harmoniously fit into the external contour of the vehicle.

The object of the invention is to create an optical display, which meets the high demands of a variable, homogeneously illuminated display.

BRIEF DESCRIPTION OF THE DRAWINGS

The object is achieved by the use of display technology. The subsequent description explains the realization of the solution according to the invention by means of exemplary embodiments.

DETAILED DESCRIPTION OF THE INVENTION

Figure 1:
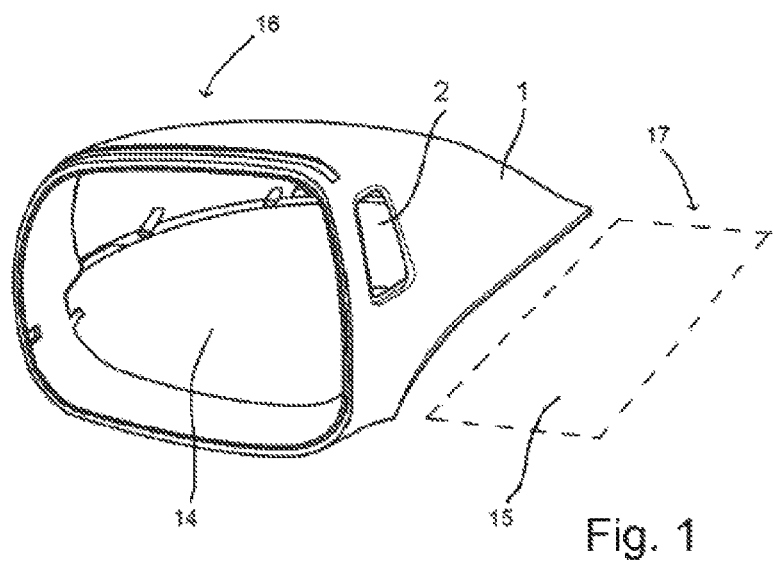
FIG. 1 shows a typical mounting location.

Optical displays on and in the exterior mirror must be installed in a position, which allows the driver to see the display. Since it is disadvantageous if the beam path of the optical display must be laboriously diverted, advantageous installation positions are available on and in the mirror base 17, or in the region of the mirror housing, which extends close to the vehicle. An exemplary arrangement is shown in FIG. 1. A part of an exterior mirror assembly can be seen here, consisting of a mirror base 17 having a mirror base cover 15 and a mirror head 16 pivotably mounted thereto.

FIG. 1 shows a housing cover 1, which at least partly surrounds the mirror head. The housing cover 1 comprises several openings, firstly for receiving a mirror glass, which is mounted on a holder with or without an adjustment motor. Furthermore, the housing cover 1 comprises an opening 2 for receiving an optical display.

In the example described, the opening 2 is formed by a material recess. A variant can also be implemented in another embodiment, in which the opening 2 for the optical display is a light opening, and the material in this position consists of transparent or semi-transparent material. Light openings of this type can be produced by two-component injection molding.

Figure 2:
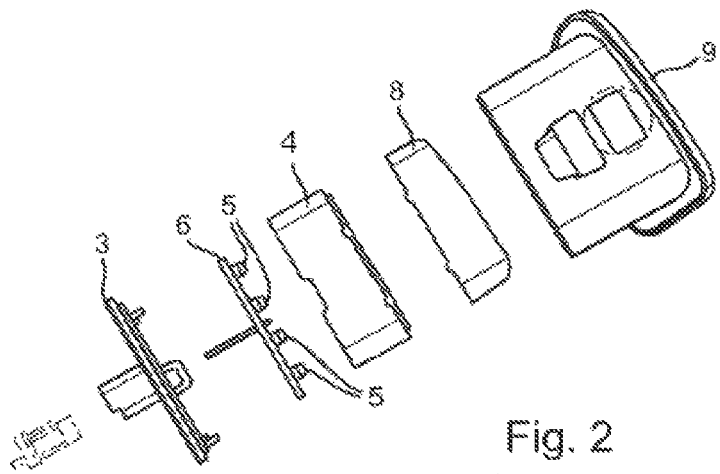
FIG. 2 shows a display in the prior art as an exploded view.

FIG. 2 shows the design of an optical display as used in the prior art.

A housing cap 3 closes a display housing 4 to a closed module, which is installed in this configuration. A closed module means a structural configuration; the module does not have to be hermetically sealed against environmental influences such as moisture and dust. The light sources are situated on a board 6 within the display housing 4. This here concerns four LEDs 5, which are mounted equidistantly, in order to achieve illumination, which is as even as possible, of the optical display. A collecting lens, here specifically a Fresnel lens, which is mounted or integrated on the upper side of a hollow body, is situated in the beam path of the LEDs. An optical lens 9 optimizes the emission characteristics of the optical display. If necessary, the optical lens and the collecting lens can also be accommodated in an optical component. An external cover pane 8 is situated above this, which is adapted to the geometry and size of the opening 2, and is sealed with a sealing ring, in order to prevent the entry of dust and moisture.

The use of LEDs is common in the prior art, but other light sources are also possible for the backlighting. EL foils or OLEDs as well as their further developments are used. To this end, the number of light sources and their arrangement depends on the respective display.

Figure 3:
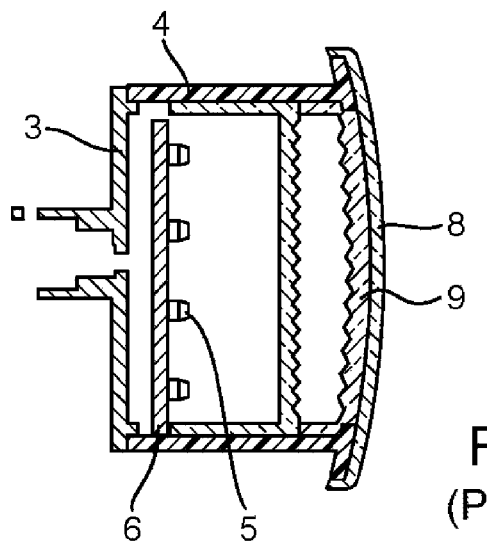
FIG. 3 shows a cut through a display in the prior art.

FIG. 3 shows this design again in a sectional view. Despite the effort, homogeneous illumination of the external cover pane 8 is not achieved with a Fresnel lens and an optical lens. Brightness focus points of the LEDs can still be detected from the outside.

In addition, at a suitable angle, the LEDs and the printed circuit board can be seen through the cover pane.

Figure 4:
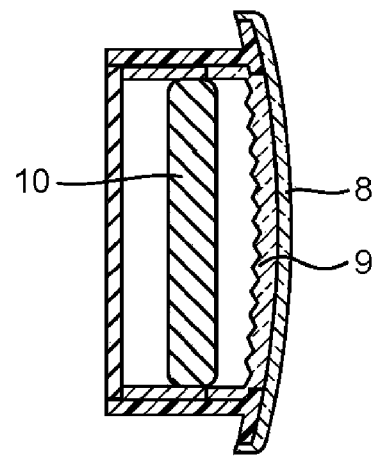
FIGS. 4 and 5 show a display according to the invention.
Figure 5:
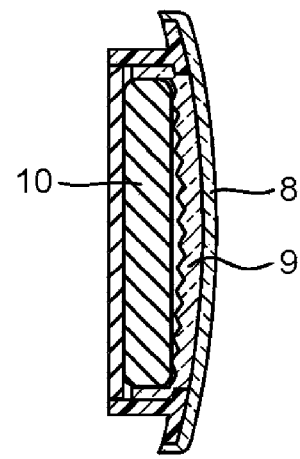

FIG. 4 shows a design for an optical display with an optically active element, for example, an LCD element 10. As a light source, no individual LEDs are used on a board, but a background lighting which with the current prior art rather achieves complete lighting for liquid crystal cells or displays. In the display according to the invention, LCD cells with integrated lighting are used, as they are used in large quantities in mobile telephones. The LCD element 10 is mounted into the display housing 4 and electrically contacted. In the example of FIG. 4, another additional optical lens is present, which is covered by the external cover pane 8. In order to simplify the design, the optical lens is not present in FIG. 5. The LCD element is covered by the external cover pane.

Various possibilities are available for receiving the display, which are already known from the prior art of display attachments in instrument clusters inside the vehicle. The display is not permitted to be installed with high stain, since otherwise there is the risk of destruction of the functionality of the display. There is also the possibility of implementing the display in an injection molding process, and therefore to produce a two-component part from the display and the plastic housing. The two-component element can also be expanded to a three-component element, in which the cover pane is also applied. The LCD element 10 consists of pixels, which, in the simplest case, all have the same color. The control typically takes place in the prior art with the so-called matrix control by control of individual lines horizontally and vertically, which thus makes it possible to switch on or off individual pixels, and therefore to selectively control the light through the display per pixel. It is also possible to design the display control in such a way that in the controlled state, all pixels are simultaneously active or inactive, so that the element is completely illuminated. A colored configuration is also possible when using LCD elements. In addition, the color for the warning display can be varied, in order to achieve gradual increments of the hazard warning. When using LCD cells, information symbols as in a conventional display can also be generated.

As an active optical element of first choice, liquid crystal displays are suitable due to their sophisticated development state and their qualities. Liquid crystals are organic compounds, which have the characteristics of liquids as well as the characteristics of solid bodies. A simple liquid crystal display element consists of the "Schadt-Helfrich cell": The inner sides of two glass plates are coated with a transparent electrode layer, with the liquid crystal situated in between. The molecules are arranged in a pre-determined direction, parallel to the surface coated with a polyamide and brushed in a preferred direction. In addition, both external plates are coated with polarization filters rotated 90 degrees to one another. The result of this is that the liquid crystals are arranged helically, with a helix twisted 90 degrees being known as a TN=Twisted Nematic.

The incident light from background lighting is polarized before entry into the liquid. Due to the twisting of the molecule surfaces, a rotation of the polarization direction of the light takes place. In turn, this results in the light being able to pass the opposing filter, and the cell shines brightly. In an idle state, the display is transparent; this arrangement is also named normally white mode.

If an electrical voltage is applied to the electrodes, a rotation of the molecules also occurs under the influence of the electrical field, so that they are orientated perpendicularly to the electrode surfaces. The twisting is thus cancelled, the polarization direction of the light is no longer changed, and therefore it cannot pass the second polarization filter.

The inverse function is expedient for the use as an optical display: If the polarization filters are arranged in parallel, the cell is dark without voltage and bright with voltage. This is normally black mode. This design is usually not used in display technology due to poor contrast ratios. However, it is well suited for the optical display. A display can theoretically consist of any number of cells of this type. In a TFT monitor, three cells together show a color pixel.

In STN displays (Super Twisted Nematic), the twist angle of the molecules is increased to 180-270°. Therefore, a higher contrast than with usual TN displays can be achieved. These displays are also named blue mode LCDs, since color shifts occur due to the dichroism: In the process, white becomes reddish to orange. This design and also the color shift can be advantageously used for the optical display. In many cases, the optical displays should warn in shades of red, so color compensation is not at all desirable.

For use in the automotive industry as an optical display, the 'Double Super Twisted' DSTN technology comes into question, which is mass-produced. If an electrical field lies on the active cell, then the linear polarized light passes smoothly through from the rear polarizer without being changed. Circular polarization first takes place in the passive cell. Because circularly polarized light is not retained by the polarizers, the screen is bright at this point. Through exact alignment of the materials used, as well as the cell dimensions, the light passing through becomes white. The complex design of a DSTN liquid crystal cell involves relatively high effort in its production. A new process is therefore developed, which leads to flatter displays with lower weight. This new solution is named triple supertwisted nematic LCD (TSTN). There is only one STN-LC cell. The color interferences of normal STN technology are counterbalanced by two special films, which are applied—between the polarizer and glass—in front of and behind the cell. These films are responsible for another name of this technology: FST, "Film-Supertwisted". The considerably improved contrast, the lower weight, the flatter and less laborious construction methods have made TSTN-LC displays possible as a mass product.

The statements on the LCD cell should not limit the invention to the use of a cell of this type. Any other actively illuminated cell which can be actively controlled, such as an OLED (organic LED) or AMOLED (Active Matrix Organic LED) cell, can be used. Only the element must be robust enough for outdoor use on the vehicle. The cell in the optical display must simply be an active illuminated cell. LEDs, which emit into a diffuser plate at the side, are used as background lighting in commercial LCDs. The light is homogeneously coupled into the actual liquid crystal cells by optical films.

Figure 6:
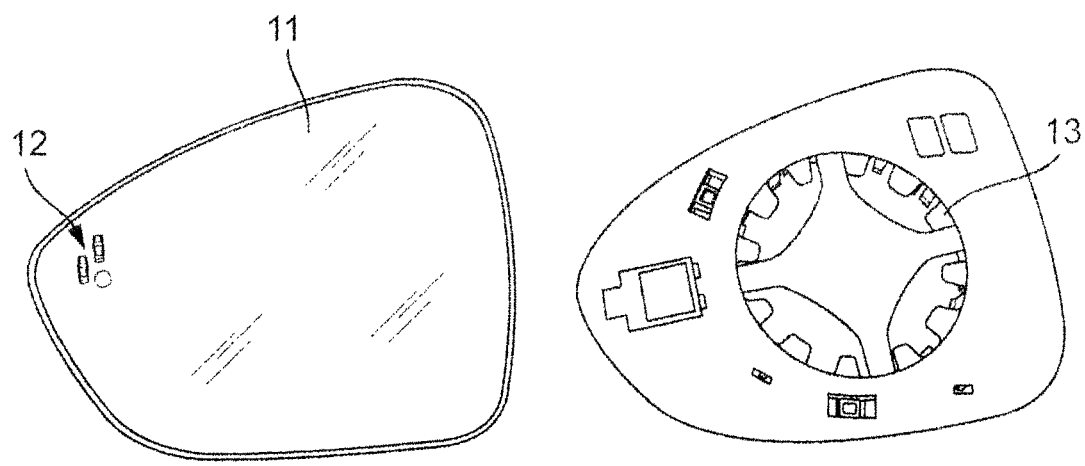
FIG. 6 shows an alternative embodiment.
Figure 7:
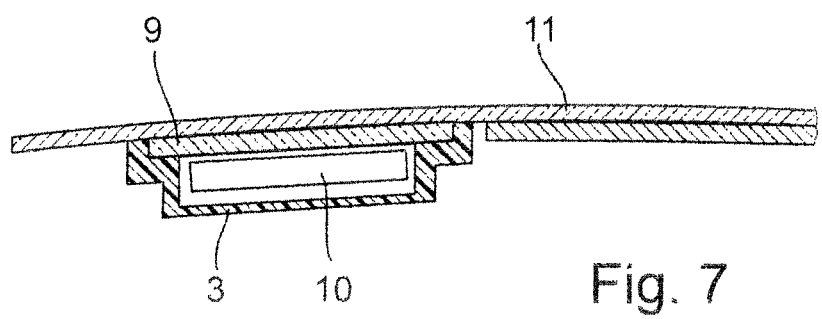
FIG. 7 shows lighting behind mirror glass.

FIGS. 6 and 7 show alternative solutions for the optical display. In the prior art, lighting modules are already known, whose light shines through a mirror glass in the direction of the driver. For this purpose, the mirroring layer is removed extensively or in the form of signs. The lighting element is applied behind the mirror glass.

FIG. 6 shows a mirror glass 11, into which signs 12 are introduced. The mirror glass is adhered onto a backing plate 13. The optical display is situated as backlighting of the sign in the region of the signs in the mirror glass. In this case, the optical display is either adhered to the rear side as a separate module, or is structurally integrated into the backing plate, which is connected to the mirror glass.

The design of the optical display corresponds to the design according to FIG. 4.

A housing cap 3 closes a display housing 4 to a closed module, which is installed in this form. The light sources, the LCD element 10, are situated within the display housing 4. An optical lens 9 closes the display housing, which is directly connected to the mirror glass 11.

The invention claimed is:

1. Exterior mirror assembly with an optical display, which comprises a mirror base and a mirror head, as well as at least one housing cover, which has a recess for a reflecting element, whereby on the exterior mirror assembly, a light opening is provided for the passage of light of an optical display, characterized in that the optical display consists of a display housing, into which an active illuminated display element is mounted exclusively of any other light source, wherein the active illuminated display element is configured to display a plurality of varied colors representing a warning notice, wherein the illuminated display element is configured to display a different one of the plurality of varied colors in succession to achieve gradual increments of a hazard warning of the displayed warning notice.

2. Exterior mirror assembly with an optical display according to claim 1, characterized in that the display housing is closed with an external cover pane.

3. Exterior mirror assembly with an optical display according to claim 1, characterized in that the display housing contains at least one optical lens.

4. Exterior mirror assembly with an optical display according to claim 1, characterized in that the display element is an element from the group consisting of LCD, TFT-LCD, TSTN, FST, OLED, and AMOLED with integrated background lighting.

5. Exterior mirror assembly with an optical display according to claim 1, characterized in that the active illuminated display element is a normally black mode display element.

6. Exterior mirror assembly with an optical display according to claim 1, characterized in that the active illuminated display element is a normally white mode display element.

7. Exterior mirror assembly with an optical display according to claim 1, characterized in that the active illuminated display element is configured to allow control of a color intensity or grayscale.

8. Exterior mirror assembly with an optical display according to claim 1, characterized in that the active illuminated display element is mounted in the side region of the at least one housing cover.

9. Exterior mirror assembly with an optical display according to claim 1, characterized in that the active illuminated display element is mounted in region of the mirror base.

10. Exterior mirror assembly with an optical display according to claim 1, characterized in that the active illuminated display element is mounted behind the reflecting element.

11. Exterior mirror assembly for a vehicle, said exterior mirror assembly with an optical display defining a mirror base and a mirror head, as well as at least one housing cover, which has a recess for a reflecting element, whereby on the exterior mirror assembly an active illuminated display element is configured to display a warning notice for a driver of the vehicle, wherein the illuminated display element comprises a liquid crystal display device and is configured exclusively of any other light source, wherein the liquid crystal display device displays colors forming the warning notice, and wherein the illuminated display element is configured to allow variation of one of the displayed colors to achieve gradual increments of a hazard warning scale of the displayed warning notice.

* * * * *